June 4, 1968 O. D. GRANDSTAFF ET AL 3,387,096

OPERATOR'S TRANSMISSION COUPLING CIRCUIT

Filed Dec. 23, 1964 2 Sheets-Sheet 1

INVENTORS
OTHO D. GRANDSTAFF
VERNON F. WEBER

BY [signature]
ATTY.

June 4, 1968 O. D. GRANDSTAFF ET AL 3,387,096

OPERATOR'S TRANSMISSION COUPLING CIRCUIT

Filed Dec. 23, 1964 2 Sheets-Sheet 2

INVENTORS
OTHO D. GRANDSTAFF
VERNON F. WEBER
BY
[signature]
ATTY.

United States Patent Office 3,387,096

Patented June 4, 1968

3,387,096

OPERATOR'S TRANSMISSION COUPLING CIRCUIT

Otho D. Grandstaff, Oak Park, and Vernon F. Weber, Elmhurst, Ill., assignors to Automatic Electric Laboratories, Inc., Northlake, Ill., a corporation of Delaware Filed Dec. 23, 1964, Ser. No. 420,736

3 Claims. (Cl. 179—81)

ABSTRACT OF THE DISCLOSURE

A substation is bridged resistively onto a four-wire or two-wire line such that side tone suppression occurs by cancellation.

This invention relates to telephone coupling circuits and more particularly to circuits for coupling a four-wire telephone circuit to a four-wire transmission system.

When connecting a telephone circuit to a transmission system, it is necessary to avoid interaction between the transmission lines due to the insertion of the telephone circuit, and at the same time to minimize, or at least control, the side tone in the telephone circuit. A coupling means which has been employed to accomplish the above in a four-wire transmission system is a four-way bridge circuit. It has proved a satisfactory solution, but still there are certain disadvantages with it.

One disadvantage is the click produced on the lines upon connection or disconnection of the telephone circuit. This click occurs because the connecting points on the bridge are terminated in a dummy load which simulates the impedance of the telephone circuit. The need for the dummy load arises because the bridge must be kept balanced at all times so as not to disrupt the balance of the entire system. Consequently, when the telephone circuit is connected or disconnected, there must be a simultaneous decoupling of the dummy load and coupling of the telephone circuit, and thus a click is produced.

Another disadvantage is that the telephone circuit may be connected up only at a predetermined location. This stems from the fact that the bridge becomes part of the system and must remain in the system even when the telephone circuit is disconnected. At points in the transmission system where such a bridge is not provided, it is difficult, if not impossible, to make connections in a telephone circuit.

Accordingly, it is an object of this invention to provide an improved circuit for coupling a four-wire telephone circuit to a four-wire transmission system which minimizes interaction between the lines in the transmission system and reduces or eliminates the side tone in the telephone circuit.

Another object of this invention is to provide a circuit for coupling a four-wire telephone circuit to a four-wire transmission system without producing clicks on the transmission lines.

Still another object of this invention is to provide a circuit for coupling a four-wire telephone circuit to a four-wire transmission system at any point of the system.

Figure 1:
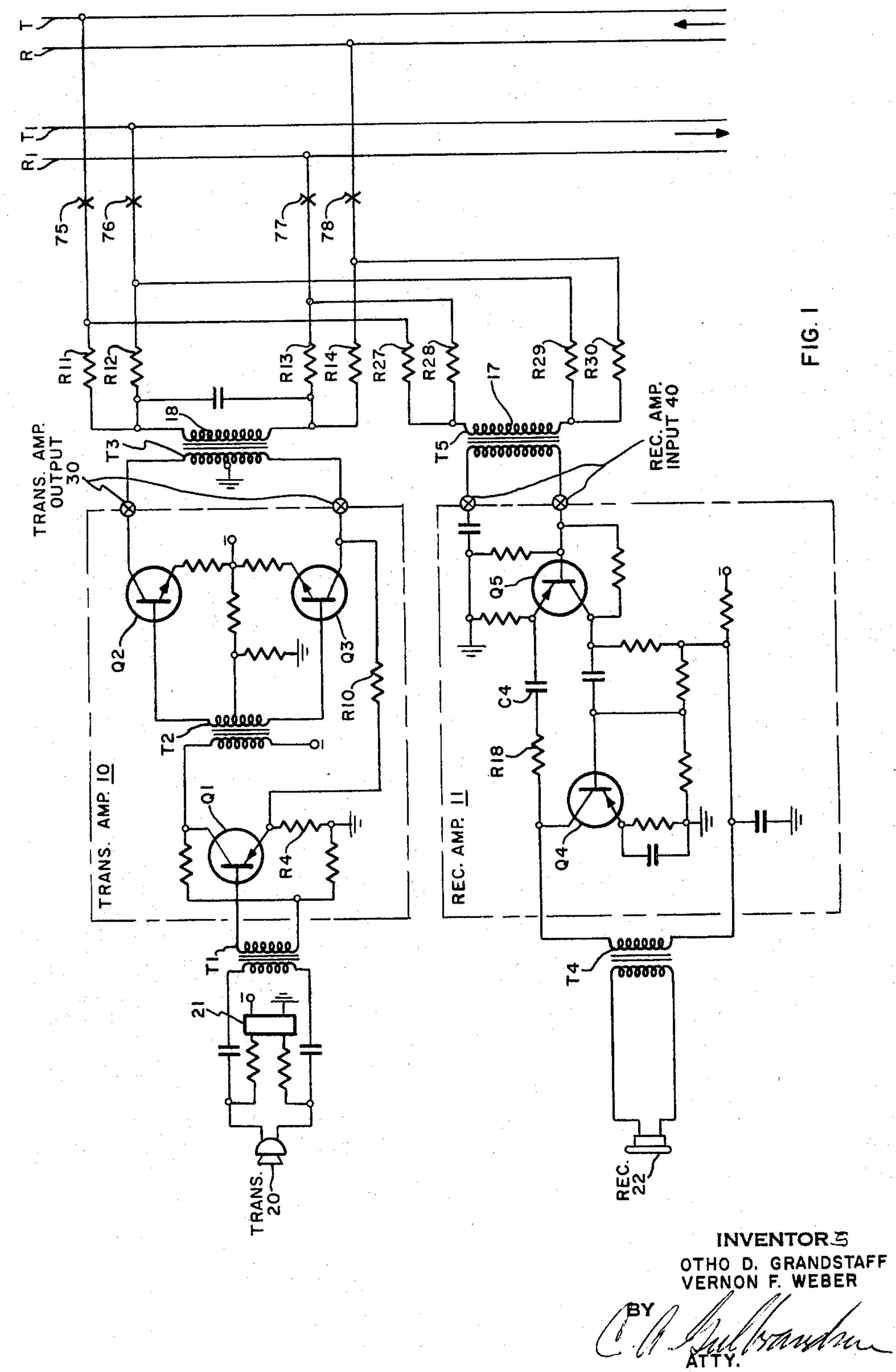
FIG. 1 is a schematic diagram of an arrangement according to the invention for coupling a four-wire telephone circuit to a four-wire transmission system.

The components of the embodiment of the invention shown in FIG. 1 include, at the right hand side of the figure, a four-wire transmission system including two tip and ring wire-pairs, one T, R, for transmission in the west-east direction, the other $T_1$, $R_1$, for transmission in the east-west direction. Shown at the left hand side of FIG. 1 is a telephone circuit e.g. an operator's telephone circuit which may be selectively connected by way of contacts, such as 75 to 78, with any one of a number of four-wire transmission circuits such as the transmission circuit T, R, $T_1$, $R_1$ shown on the drawing.

The telephone circuit shown in FIG. 1 comprises a transmit path including a transmitter 20 having a battery feed relay 21, a transmit amplifier 10 coupled to this bridge 21 by a coupling transformer T1, and a coupling transformer T3 for connecting the output 30 of the transmit amplifier 10 to the transmission system by way of isolating resistors R11 to R14 and contacts 75 to 78. The telephone circuit also comprises a receive path including a receive amplifier 11 coupled to the receiver 22 by coupling transformer T4. The input 40 of receive amplifier 11 is connected to the two wire pairs T, R and $T_1$, $R_1$ of the transmission system by means of coupling transformer T5, by way of isolating resistors R27 to R30 and contacts 75 to 78.

The reason for using the isolating resistors R11 to R14, R27 to R30, is to keep the bridging loss to a minimum and at the same time to insure a minimum of coupling between the transmission lines T, R and $T_1$, $R_1$. Because of these resistors, R11 to R14, R27 to R30, there is also provided a clickless connection when the telephone circuit is connected to or disconnected from the transmission system at contacts 75 to 78.

On the other hand, as far as communication between the operator's telephone and the two transmission pairs, T, R and $T_1$, $R_1$, is concerned amplifiers 10 and 11 make up for the loss due to isolating resistors R11 to R14 and R27 to R30.

It is to be noted that in FIG. 1 there is a reversal in the connection of one of the two wire pairs to the primary winding 17 of coupling transformer T5, viz. through resistors R28 and R29. This reversal insures that signals emanating from the secondary 18 of transmit transformer T3 are impressed on the primary 17 of receive transformer T5 by way of isolating resistors R12, R29 and R13, R28 in opposition to signals emanating from secondary 18 and reaching primary 17 by way of isolating resistors R11, R27 and R14, R30. These two signals, therefore cancel each other so that the side tone in receiver 22 due to voice frequencies from transmitter 20 is correspondingly reduced. It will be appreciated that the above reversal which is shown in FIG. 1 and introduced in the connections of resistors R28 and R29, could instead be introduced in one of the other three connections i.e. through resistors R12, R13 or resistors R11, R14, or resistors R27, R30.

It may be added that in the embodiment illustrated in FIG. 1, the above-mentioned transmit amplifier 10 is a two-stage amplifier having an input stage Q1 coupled to a push-pull output stage Q2, Q3 by coupling transformer T2 and having negative feedback path R4, R10. The receive amplifier 11 is also a two-stage transistor amplifier; it has an input stage Q5, an output stage Q4, and a negative feedback path R18, C4. However, these amplifiers may be modified without detracting from the spirit of the invention.

In a typical embodiment of the circuit shown in FIG. 1, the isolating resistors R11–R14, R27–R30, may be, for example, of 22K ohms each, resulting in a bridging loss due to the correction of the operator's telephone circuit to the four-wire transmission system, of no greater than 0.1 db. The gain of the transmit receive amplifiers is such as to compensate for the loss caused by the isolating resistors. Also, coupling between the transmission lines T, R and $T_1$, $R_1$ is negligible, e.g. 50 db or more, and the side tone level is approximately 25 db down.

Figure 2:
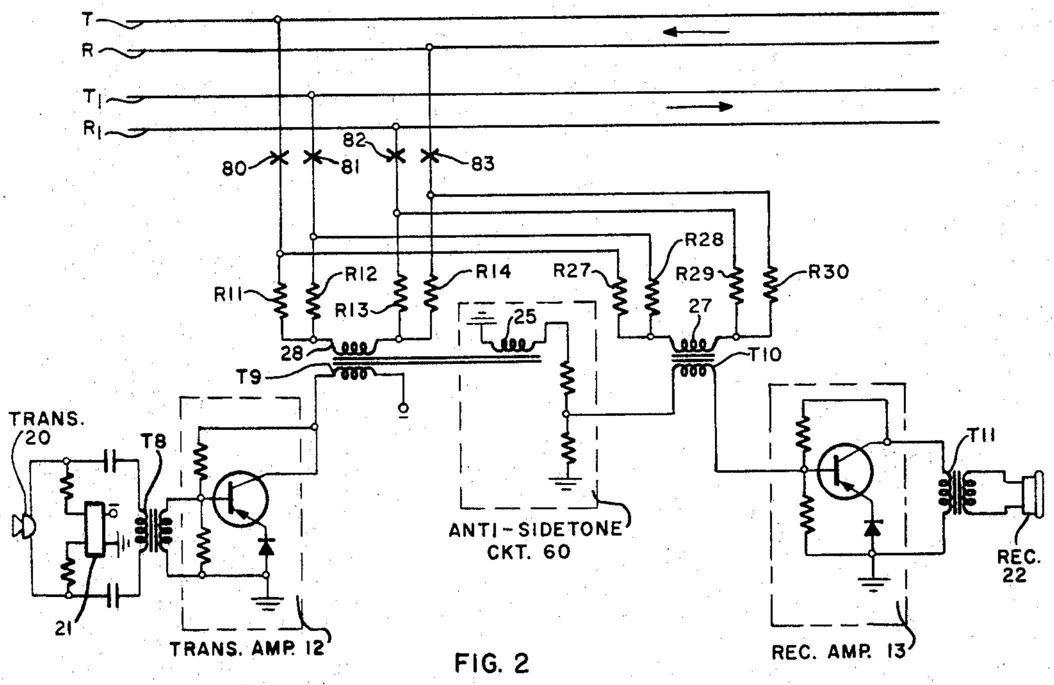
FIG. 2 is a schematic diagram of another arrangement according to the invention for coupling a four-wire telephone circuit to a four-wire transmission system.

FIG. 2 is similar to that of FIG. 1 in that in both arrangements means are provided for cancelling the side tone produced from signals emanating from transmitter 20 and eventually arriving at receiver 22. However, FIG. 2, instead of using a reversal in the connections of the isolating resistors, accomplishes this result by the addition of a separate anti-side tone coupling circuit 60.

In FIG. 2 there is shown an operator's telephone circuit similar to that of FIG. 1, comprising transmit and receive paths. The transmit path includes a transmitter 20 which is connected to transmit amplifier 12 by coupling transformer T8. The transmit amplifier 12 is then connected to the transmission system, comprised of transmission lines T, R and $T_1$, $R_1$, by coupling transformer T9, by way of isolating resistors R11–R14 and contacts 80–83. The receive path includes a receiver 22 connected to a receive amplifier 13 by coupling transformer T11. Receive amplifier 13 is in turn connected to the transmission system T, R, $T_1$, $R_1$, by coupling transformer T10, by way of isolating resistors R27–R30 and contacts 80–83.

Referring now to anti-side tone circuit 60, it should be noted that wound on the same core of transmit coupling transformer T9 is a tertiary winding 25 which picks up amplified signals emanating from transmitter 20 and impresses them through a voltage divider configuration R32, R33 on winding 26 of transformer T10. These signals are used then to cancel signals originating at transmitter 20 but which are impressed by the secondary winding 28 of transformer T9 on the primary winding 27 of transformer T10 by way of the isolating resistors R11–R14, R27–R30. In this connection it should be noted that, contrary to FIG. 1, there is no reversal in the connection of the isolating resistors in the present instance. The isolating resistors R11–R14, R27–R30, serve the same purpose as in FIG. 1, i.e. to keep the bridging loss to a minimum, at the same time insure a minimum of coupling between the transmission lines T, R, and $T_1$, $R_1$, and provide a clickless connection upon connection or disconnection of the telephone circuit from the transmission system.

Figure 3:
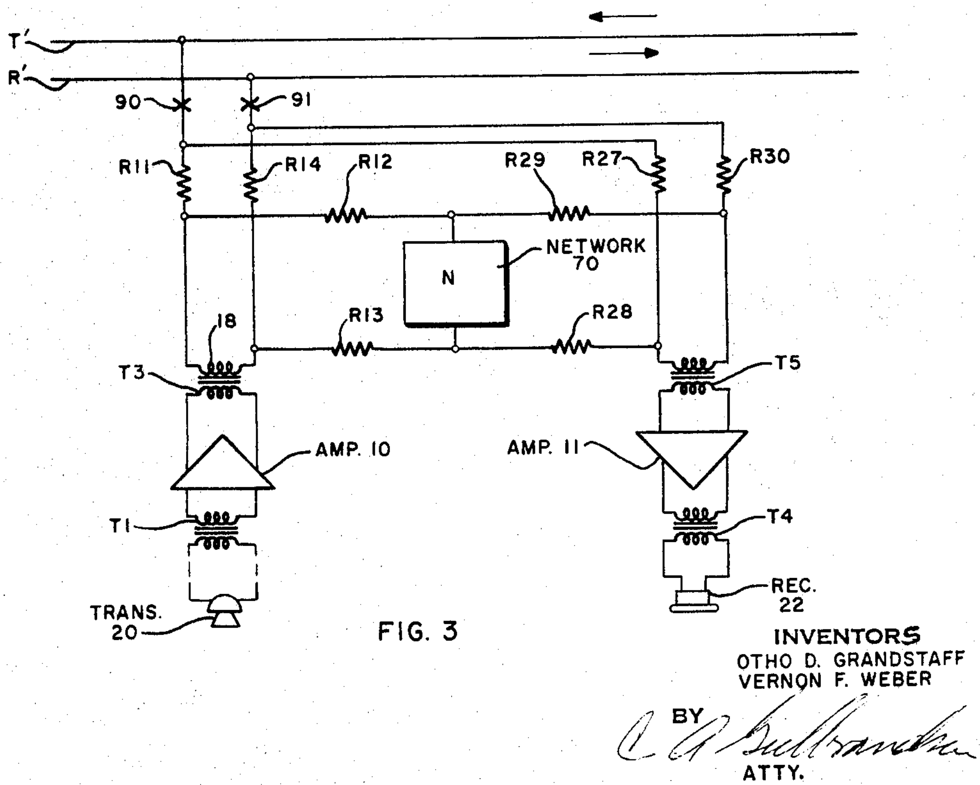
FIG. 3 is a schematic diagram of an arrangement according to the invention adapted for coupling a four-wire telephone circuit to a two-wire transmission system.

FIG. 3 is a schematic diagram illustrating how coupling equipment of the type shown, for example in FIG. 1, may be adapted to connect a four-wire operator's circuit to a two-wire transmission system.

FIG. 3 is similar to FIG. 1 except that the four-wire transmission system of FIG. 1 has been replaced by a two-way, two-wire transmission system R′, T′ and a network 70. The network is used here to simulate the second two-wire pair and may be simply a 300 ohm resistor. The reversal in the connections of the isolating resistors is also used in FIG. 3 to cancel signals emanating from the transmitter 20 and eventually arriving at receiver 22 so as to substantially reduce the side tone. It should also be noted that the connections connecting the network 70 to the secondary 18 of coupling transformer T3 by way of isolating resistors R12, R13 are reversed with respect to the remaining connections, but this reversal could instead be introduced through resistors R12, R13, or resistors R11, R14, or resistors R27, R30, as mentioned above in connection with FIG. 1. The isolating resistors R11–R14, R27–R30, serve the same purpose as they did in FIG. 1 and FIG. 2.

It will be obvious to those skilled in the art that changes and modifications may be made without departing from this invention in its broadest aspects and therefore the aim in the appended claims is to cover all such changes and modifications as in the true spirit and scope of this invention.

What is claimed is:

1. In combination: a four-wire transmission system having a first wire pair for transmitting in one direction and a second wire pair for transmitting in the other direction, an operator's telephone circuit including a transmitting amplifier having an output and a receiving amplifier having an input, and coupling means connecting said telephone circuit to said wire pairs so as to minimize side tone and prevent clicks, said coupling means including a first and second set of isolating resistors, each having a first and second pair, said first pair of said first set interconnecting said first wire pair and said output, said second pair of said first set interconnecting said first wire pair and said input, said first pair of said second set interconnecting said second wire pair and said output; said second pair of said second set interconnecting said second wire pair and said input; said second pair of said first set of said resistors being connected to said input in a reverse sense with respect to said second pair of said second set of resistors, so that voice frequency voltages originating at said output and impressed on said input via said first set of resistors are impressed on said input in opposition to voice frequency voltages originating at said output and impressed on said input via said second set of resistors.

2. In combination: a transmission system including a single wire pair for transmitting in opposite directions, a network having an impedance simulating that of said wire pair, an operator's telephone circuit including a transmitting amplifier having an output and a receiving amplifier having an input, and coupling means connecting said operator's telephone circuit to said transmission system, including a first and second set of isolating resistors, each having a first and second pair; said first pair of said first set of resistors interconnecting said wire pair with said output; said second pair of said first set of resistors interconnecting said wire pair with said input; said first pair of said second set of resistors interconnecting said network with said output; said second pair of said second set of resistors interconnecting said network with said input; said second pair of said first set of resistors being connected to said input in a reverse sense with respect to said second pair of said second set of resistors, so that voice frequency voltages originating at said output and impressed on said input via said first set of resistors is impressed on said input in opposition to voice frequency voltages originating at said output and impressed on said input via said second set of resistors.

3. In combination, a four-wire transmission system comprising first tip and first ring conductors for transmission in one direction and second tip and second ring conductors for transmission in the opposite direction, an operator's telephone circuit comprising a transmitting amplifier circuit including an output transformer having a two-terminal output winding and a receiving amplifier circuit including an input transformer having a two terminal input winding, switch means including a plurality of contacts which are operable to connect said operator's telephone circuit to said four-wire transmission system, a first pair of resistors connected between a first terminal and a second terminal of said output winding and said first tip conductor and said first ring conductor, respectively, via a first pair of said contacts, a second pair of resistors connected between a first terminal and a second terminal of said input winding and said first tip conductor and said first ring conductor, respectively, via said first pair of contacts, a third pair of resistors connected between said first and second terminals of said output winding and said second tip conductor and said second ring conductor, respectively, via a second pair of said contacts, and a fourth pair of resistors connected between said second and first terminals of said input winding and said second tip and second ring conductors, respectively, via said second pair of contacts.

References Cited

UNITED STATES PATENTS

| | | | |
|---|---|---|---|
| 2,282,403 | 5/1942 | Herrick | 179—170.8 |
| 2,909,733 | 10/1959 | Walter | 179—170 XR |
| 2,988,712 | 6/1961 | Rhodes | 179—170 |
| 3,060,265 | 10/1962 | Duncan et al. | 179—170 |

KATHLEEN H. CLAFFY, *Primary Examiner.*

R. P. TAYLOR, *Assistant Examiner.*